(12) United States Patent
Kepeklian

(10) Patent No.: US 10,838,999 B2
(45) Date of Patent: Nov. 17, 2020

(54) METHOD AND PLATFORM FOR THE ELEVATION OF SOURCE DATA INTO INTERCONNECTED SEMANTIC DATA

(71) Applicant: ATOS INTEGRATION, Bezons (FR)

(72) Inventor: Gabriel Kepeklian, Beauchamp (FR)

(73) Assignee: ATOS INTEGRATION, Bezons (FR)

( * ) Notice: Subject to any disclaimer, the term of this patent is extended or adjusted under 35 U.S.C. 154(b) by 50 days.

(21) Appl. No.: 15/849,851

(22) Filed: Dec. 21, 2017

(65) Prior Publication Data

US 2018/0239817 A1   Aug. 23, 2018

(30) Foreign Application Priority Data

Dec. 29, 2016   (FR) ...................................... 16 63527

(51) Int. Cl.
*G06F 7/00* (2006.01)
*G06F 16/36* (2019.01)
*G06F 16/25* (2019.01)
*G06F 16/955* (2019.01)

(52) U.S. Cl.
CPC .......... *G06F 16/367* (2019.01); *G06F 16/256* (2019.01); *G06F 16/36* (2019.01); *G06F 16/9558* (2019.01); *G06F 16/9566* (2019.01)

(58) Field of Classification Search
CPC .............. G06F 16/367; G06F 16/9558; G06F 16/9566; G06F 16/256; G06F 16/36

USPC ................................................ 707/600–899
See application file for complete search history.

(56) References Cited

U.S. PATENT DOCUMENTS 10,120,857 B2 * 11/2018 Elliot .................... G06F 40/205

OTHER PUBLICATIONS

Wiederhold, G., "Mediators in the architecture of future information systems," IEEE Computer Society, US, vol. 25, No. 3, Mar. 1, 1992, pp. 1-12.

* cited by examiner

*Primary Examiner* — Isaac M Woo
(74) *Attorney, Agent, or Firm* — Hauptman Ham, LLP

(57) ABSTRACT

The present invention relates to a platform and a method for the "elevation" of sources of heterogeneous data into interconnected semantic data, the platform comprising at least one "ontology selection" module for generating semantic data, said module being formed by at least one "ontology search" layer, one "ontology quality metrics" layer and one "ontological similarity measurements" layer, a "data conversion" module for converting the format of the semantic data produced by the selection module into RDF format, a "data interconnection" module for creating links between the semantic data converted to RDF format by means of a tool set, said platform containing at least one hardware and computer architecture for executing the data "elevation" process via executable instructions.

25 Claims, 1 Drawing Sheet

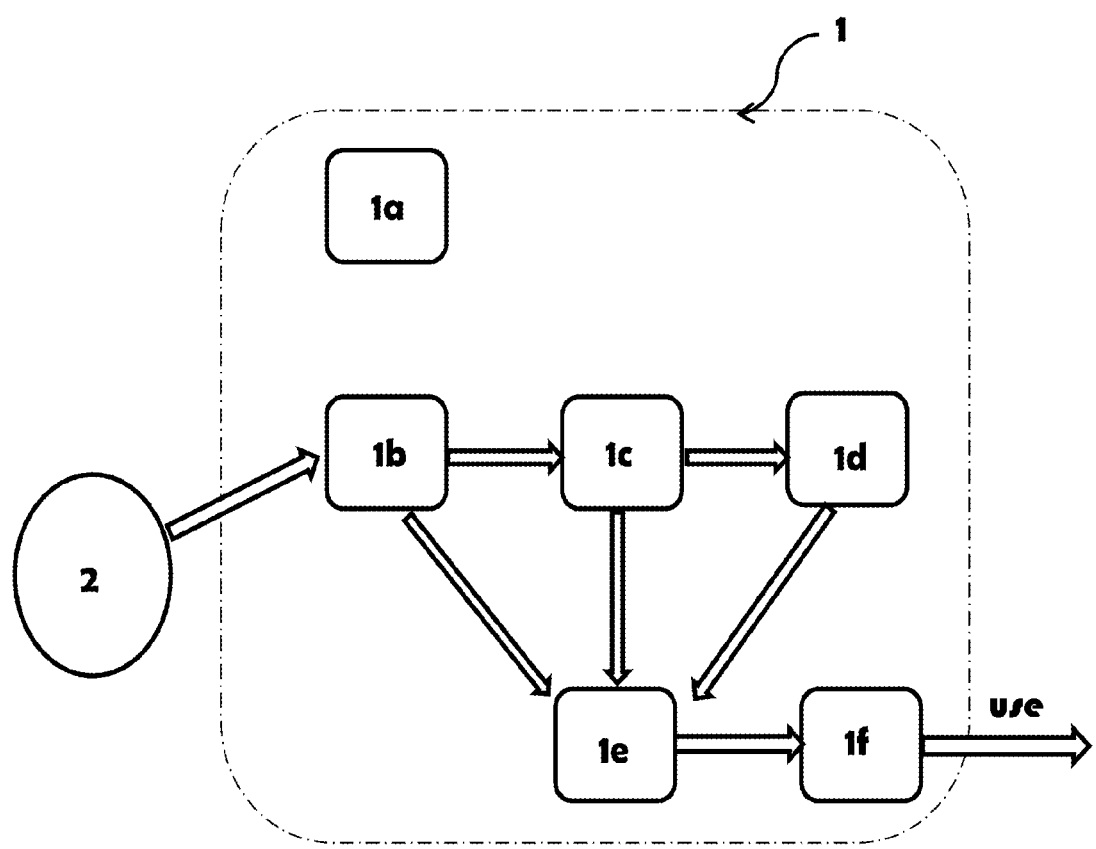

METHOD AND PLATFORM FOR THE ELEVATION OF SOURCE DATA INTO INTERCONNECTED SEMANTIC DATA

TECHNICAL FIELD OF THE INVENTION

The present invention relates to the field of processing information and more particularly a platform and a method for processing information on the semantic Web.

Technological Background of the Invention

The semantic Web (also called "data Web") is a standardized extension of the classic Web enabling machines to understand semantics, the meaning of the information on the Web. It extends the network of hyperlinks between conventional Web sites by a network of links between structured data letting automated agents more intelligently access the different data sources hosted on the Web and in this way perform more precise tasks (search, interconnection, learning, etc.) for users.

Several basic concepts, in particular ontology, are used for development of the semantic Web. Ontology is defined as a structured set of concepts for lending meaning to information. This structuring takes the form of a concept-oriented graph.

There are processes and tools for constructing ontologies to ensure processing of data and to extract semantics from them. However, these processes and/or tools do not focus for example on the characteristics of ontologies pertinent to the scope of linked data and/or need at least one manual entry of data. This can make them less adapted when data flow volumes to be processed are considerable, for example.

General Description of the Invention

The aim of the present invention is to eliminate some drawbacks of the prior art concerning processing the information.

A first aim of the invention is to propose an infrastructure for processing databases to extract information from them.

This aim is achieved by a platform for "elevation" of sources of heterogeneous data into interconnected semantic data organized into five stages (a, b, c, d, e) forming a single "all in one" source. Said platform—containing at least one hardware and computer architecture comprising at least one processor, at least one memory for storage of data and/or instructions executable by said processor—is designed for implementing functionalities supported by an extensible set of modules and at least one "management system" for controlling processes of said modules of the platform. At each stage, the list of modules is extensible. The architecture (source and modules) of the complete device which is the platform is described by means of a specific ontology which lets the platform come to know itself. This also gives it original means of parameterizing (upstream), traceability (downstream) but also effective replay or not (explicability). The resulting architectural flexibility turns the platform into a field for experiments for new functionalities. The vocation of modules can also be easily diversified or modified from a destination purely experimental to clearly industrial. The list of modules of the platform comprises at least:

a) an "ontology selection" module for selecting one or more ontologies intended for conversion of data, b) "data conversion" modules which enter data sets, called data sources, into various heterogeneous formats (CSV, XML, SHP, GML, . . . ) as well as database or TrilpeStore extractions for converting to RDF (the semantic data model) by using the semantic described in the selected ontologies or in the specific structure of the sources (in this case, ad hoc ontology is generated on the fly), c) a "data publication" module for depositing the converted sources in the internal data warehouse, d) several "data interconnection" modules for establishing different types of links between the warehoused data by means of a tool set, these links between the semantic data being semantic data in their own right, e) several "data exploitation" modules intended to produce and expose the results of various processing feasible on the semantic data.

According to another particular feature, said platform further comprises:

at least one "ontology search" layer, one "ontology quality metrics" layer, one "ontological similarity measurements" layer and at least instructions executable by a processor for implementing an interconnection functionality of said layers so as to form said "ontology selection" module;

at least instructions executable by a processor for implementing a tool set enabling automatic calculation of key identifiers in the data sets of the "data interconnection" module so as to find equivalent resources through the data sets.

According to another particular feature, the instructions of the "ontology selection" module, executable by a processor, enable definition of processes and indicators for selecting usable ontologies, each ontology being adapted to the field and to the structure of data of a given provider, and have the capacity to uphold the data interconnection, the reliability and the persistence of publication authorities, conformity to the standards of the semantic Web.

According to another particular feature, the instructions of the "ontology selection" module, executable by a processor, enable construction of at least one catalogue of ontologies, whereof the construction is based on the definition of processes and indicators, said catalogue for each ontology comprising indicators of its effective use, the degree of interconnection to other ontologies in or out of the catalogue and metadata relative to the publication authority.

According to another particular feature, the executable instructions of the "ontology selection" module contain representation structures for enabling the ad hoc representation structures of the selection module, during their execution by a processor, to structure and handle data coming from specific fields on the semantic Web.

According to another particular feature, the instructions of the "ontology selection" module, executable by a processor, define:

a process by which a data provider can select in said catalogue the ontologies or ontological patterns relative to the data to be published, and rules for mapping or conversion between the source data model and the structure of target data according to the selected ontology.

According to another particular feature, the instructions of the "data conversion" module executable by a processor design the URI sets to be used on the platform, produce directives for aiding the data editors find the right way to link the URI to their data, said URI policy covering especially the following subjects:

selecting the field name and structure of the path to maximize the persistence and the ergonomy of the URI;

maintaining or modifying the URI when the resources appear, melt, die;

resolution of the URI by representation of the resources and interconnection between them;

said directives for the editors suggesting processes of alignment between the original identifiers or data characteristics and the published URI, given different situations according to whether the source data have or do not have existing or natural identifiers.

According to another particular feature, the instructions of each "data conversion" module executable by a processor provide a tool set for designing and implementing at least one connector library for data conversion, the coding of said data for internationalization and localization, said tool set being reusable between fields and applications.

According to another particular feature, the tool set supplied by the instructions of each module of "data conversion" executable by a processor, is used to migrate the data sets from providers to RDF format.

According to another particular feature, the selection of said data sets is made so as to evaluate the robustness and the scalability of the tool set by verifying, at least, the following points:

the capacity of selected ontologies in the catalogue to deal with a wide variety of data patterns, without the need for extensions of a specific model or cutting data;

the capacity of the set of conversion of tools for ensuring the migration of data in the widest variety of formats or the original formats and encodings without extra work or allowing ad hoc interventions during the work flow;

the capacity of the data sets to provide the "data interconnection" modules with data to be interconnected either between the data sets supplied or with other data sets belonging to a cloud of linked data.

According to another particular feature, the tool set supplied by the executable instructions, by a processor, of the "data conversion" modules adds licenses and rights to the data.

According to another particular feature, the tool set supplied by the instructions, executable by a processor, of each "data conversion" module adds to each RDF triplet associated with data a "notion" source, each source specifying the real or virtual origin of said data.

According to another particular feature, the tool set for the automatic calculation of key identifiers in data sets in each "data interconnection" module comprises at least one process for analysis of statistical data using a model for linking data (record linkage) "Fellegi-Sunter" modified for the pairing of RDF data sets.

According to another particular feature, the tool set, for automatic calculation of key identifiers in data sets in each "data interconnection" module comprises at least one metadata vocabulary for attaching calculation results of a key property to the processed data sets.

According to another particular feature, the tool set, for automatic calculation of key identifiers in data sets in each "data interconnection" module, comprises at least one interconnection tool based at least on the key identifiers generated by automatic calculation of a key property.

According to another particular feature, the platform also comprises a "data publication" module for the storage of semantic data.

According to another particular feature, the "data publication" module has an architecture of data server or cloud type and is either autonomous or integrated into the platform.

According to another particular feature, the "data publication" module comprises at least one RDF storage system, and a tool set supplied by the instructions, executable by a processor, of said module for letting the data providers show the data, originating from the "elevation" of data, on the platform in the form of linked data.

According to another particular feature, the "data publication" module also comprises request and programming interfaces and a tool set for providing the URI dereferencing mechanism and the publication of the interconnections resulting from the tools of the data interconnection module.

According to another particular feature, the platform also comprises an "evaluation of data and applications" module for evaluation of the process of the "elevation" and development of applications upstream of the publication of data on the platform.

According to another particular feature, the instructions, executable by a processor, of the "evaluation of data and applications" module provide a tool set for developing means for interrogating and/or consulting and/or viewing public data.

According to another particular feature, said tool set comprises at least one interface for requesting feedback from the data providers and users on the developed applications to improve the services and functionalities of said applications.

According to another particular feature, the codes executed in the "evaluation of data and applications" module carry out at least:

web user interfaces for geographic displays and composite map/time of statistical data web applications;

web user interfaces which inform on the origin and reliability of data by using models of attachment of licenses and rights;

web user interfaces which deploy standards of the free Web for generating graphics and other displays relative to quantitative background information.

According to another particular feature, the codes executed in the "evaluation of data and applications" module, also carry out at least one API for mobile applications, said API providing access to the linked data published in the platform.

According to another particular feature, the "management system" comprises instructions, executable by a processor, providing at least one programming interface (API) for giving access to each module of the platform, said API including the "elevation" of data in external tools, development of new modules extending or improving the data publication.

Another aim of the invention is to propose a process for rectifying one or more drawbacks of the prior art.

This aim is achieved by a method for "elevation" of source data into interconnected semantic data comprising a set of sub-processes, executed at least on a processor of a computer architecture comprising at least one memory for storage of data, said set performing at least the following steps:

selection of ontologies for data publication;

conversion of said data to the appropriate format;

data interconnection with other sources, and publication of said linked data, said method being characterized in that:

the sub-process for selection of ontologies comprises at least one execution step of an ontological search process, an ontology metric process, an ontology similarity measuring process, said processes being connected;

the data interconnection sub-process executing at least one automatic calculation of key identifiers in data sets by means of a statistical model.

According to another particular feature, the sub-process for selection of ontologies also comprises the steps of:
- definition and selection of processes and indicators for selection of usable ontologies;
- construction of a catalogue of ontologies based on the defined processes and indicators;
- modelling of specific knowledge;
- mapping of the data model from providers to the ontologies of the catalogue.

According to another particular feature, the data conversion sub-process comprises steps of:
- definition of an URI policy and production of guidelines for the data editors;
- development of a suite of conversion tools;
- application of the suite of conversion tools to the data sets;
- attachment of the licenses and rights to data.

According to another particular feature, the attachment step of licenses and rights to data comprises at least the steps of:
- adding origin information to the RDF graphs by means of named graphs and an extension of the RDF model and of the RDF/XML syntax;
- linking license information to the origin and the named graphics and providing means for retrieving the information link on the license to a data element;
- extension of request mechanisms to allow traceability of data used in the responses;
- linking of access rights to the graphs by indicating the restrictions to be verified so that a request can use the data of these graphs and provide a formalism for describing the rights;
- extension of the request mechanisms to take into account the access right during the process for resolution of requests.

According to another particular feature, the data interconnection sub-process also comprises the steps of:
- development of interconnection tools of data sets;
- application of the interconnection tools to the data sets.

According to another particular feature, the processes and the indicators are selected iteratively, by evaluation of their efficiency (by an approach of scoring type) relative to construction of the catalogue, conversion of data and data interconnection.

DESCRIPTION OF THE ILLUSTRATIVE FIGURES

Other particular features and advantages of the present invention will emerge more clearly from the following description made in reference to the attached diagrams, in which:

FIG. 1 illustrates a diagram of the architecture of the platform for "elevation" of source data into interconnected semantic data, according to an embodiment;

DESCRIPTION OF PREFERRED EMBODIMENTS OF THE INVENTION

The present invention relates to a platform (1, FIG. 1) for the processing of source data and their transformation to interconnected or linked semantic data.

In some embodiments, the platform (1) for the "elevation" of source or raw data, into interconnected semantic data comprises at least one "ontology selection" module (1b) for generating semantic data from a data flow originating from at least one database (2) (see FIG. 1), a "data conversion" module (1c) containing data sets to be interconnected for converting the format of semantic data produced by the selection module (1b) into RDF format, a "data interconnection" module (1d) for creating, by means of a tool set, links between the semantic data converted to the RDF format, said platform contains at least one hardware and computer architecture comprising at least one processor, at least one memory for the storage of data and/or executable instructions, by the processor, for performing the functionalities of each module and at least one "management system" (1a) for controlling processes of each module of the platform, said platform being characterized in that it further comprises:
- at least one "ontology search" layer, one "ontology quality metrics" layer, one "ontological similarity measurements" layer and at least instructions executable by a processor for implementing an interconnection functionality of said layers so as to form said "ontology selection" module (1b),
- at least instructions executable by a processor for implementing a tool set enabling automatic calculation of key identifiers in the data sets of the "data interconnection" module (1d), so as to find equivalent resources through the data sets.

"Elevation" of data or "semantic elevation" of data means a process consisting of extracting semantics from various types of data (non-structured, semi-structured or structured) and/or non-semantic metadata, and translating said data into relations, attributes and concepts within an ontology. The latter is defined as a structure set of concepts for giving meaning to information, modelling a set of knowledge in a given field and representing a body of knowledge in a form usable by a computer. In general ontology describes objects, data sets or classes, attributes (properties, functionalities, characteristics or parameters which the objects can have and/or share), relations or links between said objects and/or events corresponding to changes undergone by attributes or relations.

The RDF format (Resources Description Framework) is a language of ontology serving to describe resources and/or affirming relations between said resources. It can be used for annotating documents written in non-structured languages, or as an interface for documents written in languages having equivalent semantics (for example, databases). The element constituting the base of the RDF is a set of triplets (subject, predicate, object), where the subject is the resource to be described, the predicate a type of property applicable to the subject, and the object a datum or another resource. The elements of these triplets can be URIs (Uniform Resource Identifiers) literals (constant values) or variables. The set of triplets is generally represented by a graph whereof the origin is its subject and the destination its object. RDF documents can be written in different syntaxes, including in XML. But RDF per se is not an XML dialect. It is possible to employ other syntaxes for expressing the triplets. RDF is simply a structure of data constituted by nodes and organized into a graph as mentioned earlier.

In some embodiments, the instructions of the "ontology selection" module (1b), executable by a processor, enable definition of processes and indicators for selecting usable ontologies. Each ontology is adapted to the field and to the structure of data of a given provider. Said instructions also have the capacity to uphold the data interconnection, the reliability and the persistence of publication authorities, conformity to the standards of the semantic Web.

In some embodiments, the instructions of the "ontology selection" module (1b), executable by a processor, enable construction of at least one catalogue of ontologies, the construction being based on the definition of processes and indicators. For each ontology said catalogue comprises indicators of its effective use, the degree of interconnection to other ontologies in or out of the catalogue and metadata relative to the publication authority.

For construction of the catalogue, the processes and indicators are applied to a wide array of ontologies, either available in public directories or search engines or from data providers. Said catalogue is built according to an iterative and incremental process in which each construction is added to the preceding, enriching it.

In some embodiments, the instructions of the "ontology selection" module (1b), executable by a processor, allow ad hoc representation structures contained in the selection module to structure and handle data coming from specific fields on the semantic Web. For example and in a non-limiting way, if the data to be processed relate to geo-located entities or territorial data, the executable instructions provide tools for annotating said geographic data with an ontology of geographic concepts.

In some embodiments, the instructions of the "ontology selection" module (1b), executable by a processor, define
a process by which a data provider can select in said catalogue the ontologies or ontological patterns relative to the data to be published, and
rules for mapping or conversion between the source data model and the structure of target data according to the selected ontology.

"Mapping" means the process for associating any type of data of a given set with those of a different set, the aim being to move from one set to another without a compatibility issue.

In some embodiments, the instructions of the module "data conversion" (1c) executable by a processor design the URI sets to be used on the platform (1) produce directives for aiding the data editors find the right way to link the URIs with their data, said URI policy covering especially the following subjects:
selecting the field name and structure of the path to maximize the persistence and the ergonomy of the URI;
maintaining or modifying the URI when the resources appear, melt, die;
resolution of the URI by representation of the resources and interconnection between them;
said directives for the editors suggesting processes of alignment between the original identifiers or data characteristics and the published URI, given different situations according to whether the source data have or do not have existing or natural identifiers.

A URI is a short chain of characters identifying a physical or abstract resource on a network (for example a Web resource). The URIs, whereof the URL (uniform resource locator) with the prefix "http" is a particular case, are essential building blocks for the semantic Web in general and for data conversion in particular. In fact, proper conversion of data requires proper identification of said data. In this way, poor design of URIs can cause poor conversion of data.

In some embodiments, the instructions of the "data conversion" module (1c), executable by a processor, provide a tool set for designing and implementing at least one connector library for data conversion, the coding of said data for internationalization and localization, said tool set being reusable between fields and applications.

Many data are currently available in a plethora of formats comprising, for example and non-limiting, databases, spreadsheets, XML documents, proprietary file formats. The connectors used by the set of conversion tools change from one format to the other compatibly.

In some embodiments, the tool set supplied by the instructions of the "data conversion" module (1c), executable by a processor, is used to migrate the data sets from providers to RDF format.

In some embodiments, the selection of said data sets is made so as to evaluate the robustness and the scalability of the tool set by verifying, at least, the following points:
the capacity of selected ontologies in the catalogue to deal with a wide variety of data patterns, without the need for extensions of a specific model or cutting data;
the capacity of the set of conversion of tools for ensuring the migration of data in the widest variety of formats or the original formats and encodings without extra work or allowing ad hoc interventions during the work flow;
the capacity of the data sets to provide the "data interconnection" module (1d) with data to be interconnected either between the data sets supplied or with other data sets belonging to a cloud of linked data.

In some embodiments, the tool set supplied by the instructions of the "data conversion" module (1c), executable by a processor, adds licenses and rights to the data.

During interrogation or reasoning on metadata from the semantic Web, the source of these metadata can be of major importance, in particular when problems of quality of service, license or access rights are considered for example. The language of SPARQL request, which searches, adds, modifies or deletes RDF data available via the semantic Web, supplies a keyword for having models match with named graphs and has no information on the source of said data. However, in the models of RDF data which focus on expressing triplets, in many cases the instructions executable by a processor add to these RDF triplets the notion of source for each triplet, typically an IRI (Internationalized Resource Identifier) specifying their real or virtual origin. Said source also comprises for example information on the origin of data and licenses and rights.

IRI means a type of computer address taking into account the various alphabets used in different world languages.

In some embodiments, the tool set supplied by the instructions, executable by a processor, of the "data conversion" module (1c) add to each RDF triplet associated with data a source "notion", each source specifying the real or virtual origin of said data.

In some embodiments, the tool set for automatic calculation of key identifiers in data sets in the "data interconnection" module (1d), comprises at least one process for analysis of statistical data using a model for linking "Fellegi-Sunter" archives modified for the pairing of RDF data sets.

The data interconnection aims to identify equivalent resources via data sets. Current interconnection tools necessarily require manual entry in the algorithm of the properties to be compared to identify a resource uniquely for example. The modified "Fellegi-Sunter" model makes this task automatic.

In some embodiments, the tool set, for automatic calculation of key identifiers in data sets in the "data interconnection" module (1d), comprises at least one metadata vocabulary for attaching calculation results of a key property to the processed data sets.

In some embodiments, the tool set, for automatic calculation of key identifiers in data sets in the "data interconnection" module (1d), comprises at least one interconnection tool based at least on the key identifiers generated by automatic calculation of a key property.

In some embodiments, the platform also comprises a "data publication" module (1e) for the storage of semantic data.

In some embodiments, the "data publication" module (1e) has an architecture of data server or cloud type and is either autonomous or integrated into the platform (1).

In some embodiments, the "data publication" module (1e) comprises at least one RDF storage system, and a tool set supplied by the instructions, executable by a processor, of said module for letting the data providers show the data, originating from the "elevation" of data, on the platform in the form of linked data.

In some embodiments, the "data publication" module (1e) also comprises request and programming interfaces and a tool set for providing the URI dereferencing mechanism and the publication of the interconnections resulting from the tools of the data interconnection module (1d).

In some embodiments, the platform also comprises an "evaluation of data and applications" module (1f) for evaluation of the process of the "elevation" and development of applications upstream of the publication of data on the platform.

The "ontology selection" (1b), "data conversion" (1c), and "data interconnection" (1d) modules are connected to the "data publication" module (1e), the latter in turn being connected to the "evaluation of data and applications" module (1f). Data coming from the "ontology selection" module (1b) are transmitted to the "data conversion" module (1c) to be converted to RDF format according to the selected ontologies. At this stage, the data can be transmitted to the "data publication" module (1e) for storage in a dedicated memory, even though they are not interconnected. For interconnection, the data must pass through the "data interconnection" module (1d) after passing through the "data conversion" module (1c).

In some embodiments, the instructions, executable by a processor, of the "evaluation of data and applications" module, (1f) provide a tool set for developing means for interrogating and/or consulting and/or viewing public data.

In some embodiments, said tool set comprises at least one interface for requesting feedback from the data providers and users on the developed applications to improve the services and functionalities of said applications.

In some embodiments, the codes executed in the "evaluation of data and applications" module (1f) carry out at least:
    web user interfaces for geographic displays and composite map/time of statistical data web applications;
    web user interfaces which inform on the origin and reliability of data by using models of attachment of licenses and rights;
    web user interfaces which deploy standards of the free Web for generating graphics and other displays relative to quantitative background information.

In some embodiments, the codes executed in the "evaluation of data and applications" module, also carry out at least one API for mobile applications, said API providing access to the linked data published in the platform (1).

In some embodiments, the "management system" (1a) comprises instructions, executable by a processor, providing at least one programming interface (API) for giving access to each module of the platform, said API including the "elevation" of data in external tools, development of new modules extending or improving the data publication.

The present invention also relates to a method of "elevation" of data for transforming source data into interconnected or linked semantic data.

In some embodiments, the method for "elevation" of source data into interconnected semantic data comprises a set of sub-processes, executed at least on a processor of a computer architecture comprising at least one memory for storage of data, said set performing at least the following steps:
    selection of ontologies for data publication;
    conversion of said data to the appropriate format;
    data interconnection with other sources, and
    publication of said linked data, said method being characterized in that:
        the sub-process for selection of ontologies comprises at least one execution step of an ontological search process, an ontology metric process, an ontology similarity measuring process, said processes being connected;
        the data interconnection sub-process executing at least one automatic calculation of key identifiers in data sets by means of a statistical model.

In some embodiments, the sub-process for selection of ontologies also comprises the steps of:
    definition and selection of processes and indicators for selection of usable ontologies;
    construction of a catalogue of ontologies based on the defined processes and indicators;
    modelling of specific knowledge;
    mapping of the data model from providers to the ontologies of the catalogue.

In some embodiments, the data conversion sub-process comprises steps of:
    definition of an URI policy and production of guidelines for the data editors;
    development of a suite of conversion tools;
    application of the suite of conversion tools to the data sets;
    attachment of the licenses and rights to data.

In some embodiments, the attachment step of licenses and rights to data comprises at least the steps of:
    adding origin information to the RDF graphs by means of named graphs and an extension of the RDF model and of the RDF/XML syntax;
    linking license information to the origin and the named graphics and providing means for retrieving the information link on the license to a data element;
    extension of request mechanisms to allow traceability of data used in the responses;
    linking of access rights to the graphs by indicating the restrictions to be verified so that a request can use the data of these graphs and provide a formalism for describing the rights;
    extension of the request mechanisms to take into account the access right during the process for resolution of requests.

In some embodiments, the data interconnection sub-process also comprises the steps of:
    development of interconnection tools of data sets;
    application of the interconnection tools to the data sets.

In some embodiments, the processes and the indicators are selected iteratively, by evaluation of their efficiency relative to construction of the catalogue, conversion of data and data interconnection.

The present application describes various technical characteristics and advantages in reference to the figures and/or to various embodiments. The skilled person will understand that the technical characteristics of a given embodiment can in fact be combined with characteristics of another embodiment unless explicitly stated otherwise or it is evident that these characteristics are incompatible or the combination provides no solution to at least one of the technical problems mentioned in the present application. Also, the technical characteristics described in a given embodiment can be isolated from the other characteristics of this embodiment unless explicitly stated otherwise.

It must be evident for skilled persons that the present invention enables embodiments in many other specific forms without departing from the field of application of the invention as claimed. Consequently, the present embodiments must be considered by way of illustration, but can be modified in the field defined by the scope of the attached claims, and the invention must not be limited to the details given hereinabove.

The invention claimed is:

1. A system for converting heterogeneous data into interconnected semantic data, the system comprising;
    a processor;
    memory for storage of data and/or instructions executable by the processor and including an internal data warehouse;
    wherein the processor executes an extensible set of modules and a management system for controlling processes of the modules;
    whereby at each stage extending the list of the modules and the architecture of the system is described by a specific ontology; and
    wherein the set of extensible modules comprises: an ontology selection module for selecting one or more ontologies intended for conversion of data, a data conversion module configured to receive a data set from a data source and convert the data set into a heterogeneous format and database extractions to convert the data to a Resources Description Framework (RDF) using semantics described in the selected ontologies, a data publication module configured to deposit the converted data in an internal data warehouse, a data interconnection module to establish links between the warehoused data, and data exploitation modules.

2. The system according to claim 1, wherein the ontology selection module is formed using interconnection functionality and wherein the data interconnection module is configured to process data sets using automatic calculation of key identifiers in data sets to find equivalent resources through the data sets.

3. The system according to claim 1, wherein the ontology selection module defines processes and indicators for selecting usable ontologies, each ontology being adapted to field and structure of data of a given provider.

4. The system according to claim 1, wherein the ontology selection module constructs a catalogue of ontologies using processes and indicators, wherein the catalogue for each ontology includes indicators of effective use, degree of interconnection to other ontologies in or out of the catalogue and metadata relative to a publication authority.

5. The system according to claim 1, wherein the ontology selection module includes representation structures to structure and handle data coming from specific fields of a semantic Web.

6. The system according to claim 1, wherein a data provider uses the ontology selection module to select from the catalogue the ontologies or ontological patterns relative to data to be published, and rules for mapping or conversion between a source data model and structure of target data according to the selected ontology.

7. The system according to claim 1, wherein the data conversion module designs universal resource Identifier (URI) sets, produces directives to aid data editors to link the URI to data, wherein URI set design includes selecting field name and structure of a path to maximize persistence and ergonomy of the URI; maintaining or modifying the URI when resources appear, melt or die; and resolution of the URI by representation of resources and interconnection between the resources; the directives suggest processes of alignment between the original identifiers or data characteristics and the URI, according to whether source data has or does not have existing or natural identifiers.

8. The system according to claim 1, wherein the data conversion module provides a tool set for designing and implementing a connector library for data conversion, the coding of said data for internationalization and localization, wherein the tool set is reusable between fields and applications.

9. The system according to claim 1, wherein the tool set is usable to migrate the data sets from providers to RDF format.

10. The system according to claim 9, wherein the selection of the data sets evaluates the robustness and the scalability of the tool set by verifying the data pattern capacity of selected ontologies in the catalogue; or verifying the migration capacity of the set of conversion of tools; or verifying the data interconnection capacity of the data sets.

11. The system according to claim 1, wherein the data conversion module adds licenses and rights to the data.

12. The system according to claim 11, wherein the data conversion module adds to each RDF triplet associated with data a source notion where the source notion specifies data origin.

13. The system according to claim 1, wherein the data interconnection module analyzes statistical data using a model for linking "Fellegi-Sunter" archives modified for pairing of RDF data sets.

14. The system according to claim 1, wherein the data interconnection module comprises a metadata vocabulary for attaching calculation results of a key property to processed data sets.

15. The system according to claim 1, wherein the data interconnection module comprises an interconnection tool using key identifiers generated by automatic calculation of a key property.

16. The system according to claim 15, wherein the data publication module has an architecture of data server.

17. The system according to claim 15, wherein the data publication module comprises am RDF storage system.

18. The system according to claim 15, wherein the data publication module further comprises request and programming interfaces.

19. The system according to claim 1, further comprising a data publication module for the storage of semantic data.

20. The system according to claim 1, wherein it also comprises an evaluation of data and applications module.

21. The system according to claim 20, wherein the evaluation of data and applications module provides interrogating and/or consulting and viewing public data.

22. The system according to claim 21, further comprising an interface for requesting feedback from data providers and users on developed applications to improve services and functionalities of the developed applications.

23. The system according to claim 21, wherein evaluation of data and applications module provides web user interfaces for geographic displays and composite map/time of statistical data web applications; and web user interfaces which inform on the origin and reliability of data by using models of attachment of licenses and rights; and web user interfaces which deploy web standards for generating graphics using quantitative background information.

24. The system according to claim 21, wherein the evaluation of data and applications module provides an application programming interface for mobile applications, where the application programming interface provides access to linked data.

25. The system according to claim 1, wherein the management system provides an application programming interface to provide access to the modules.

* * * * *